July 5, 1932.  O. BAHLS  1,866,389
REFRIGERATING DEVICE
Filed Jan. 24, 1929    4 Sheets-Sheet 1
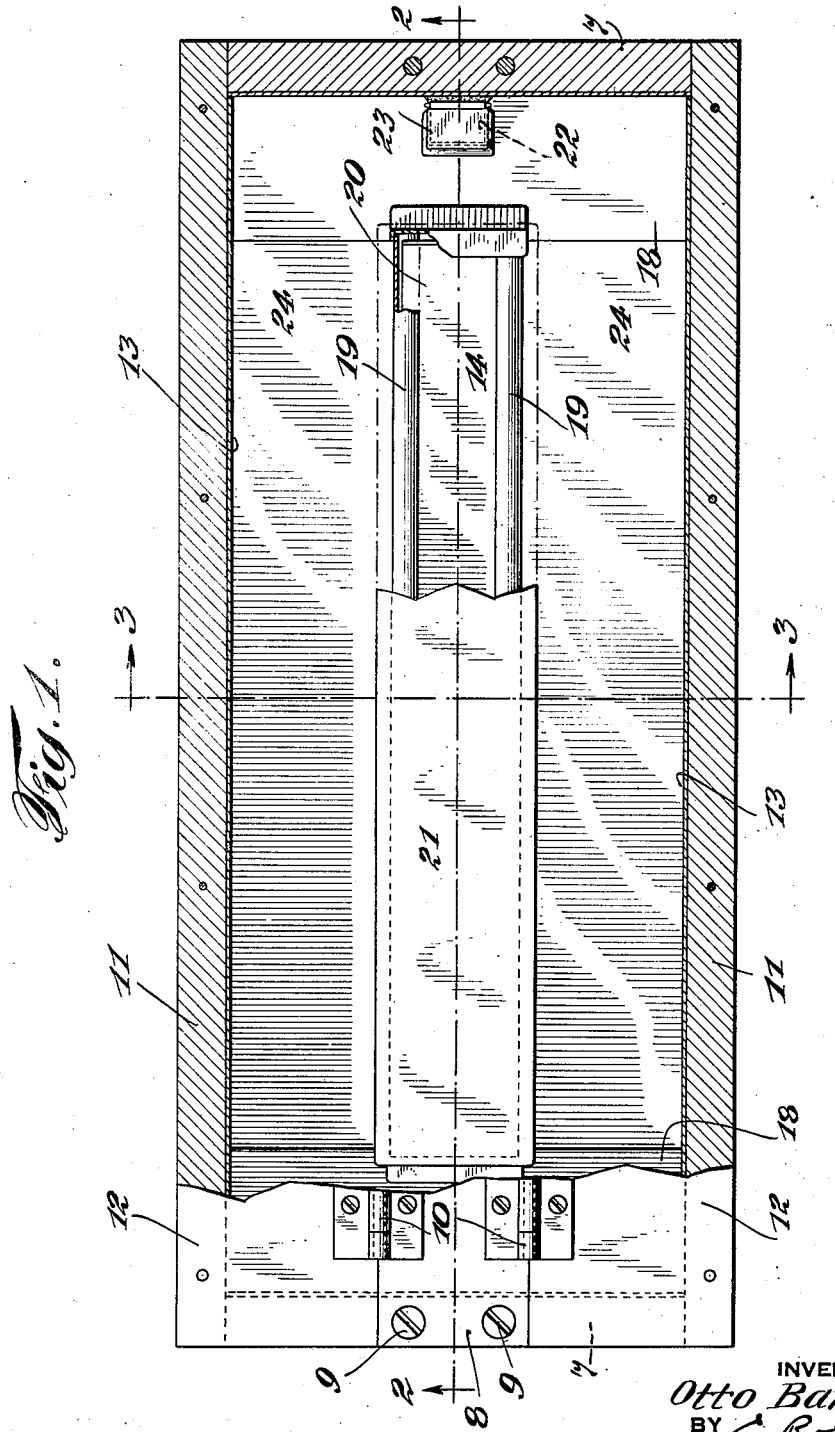
INVENTOR
Otto Bahls
BY
his ATTORNEY

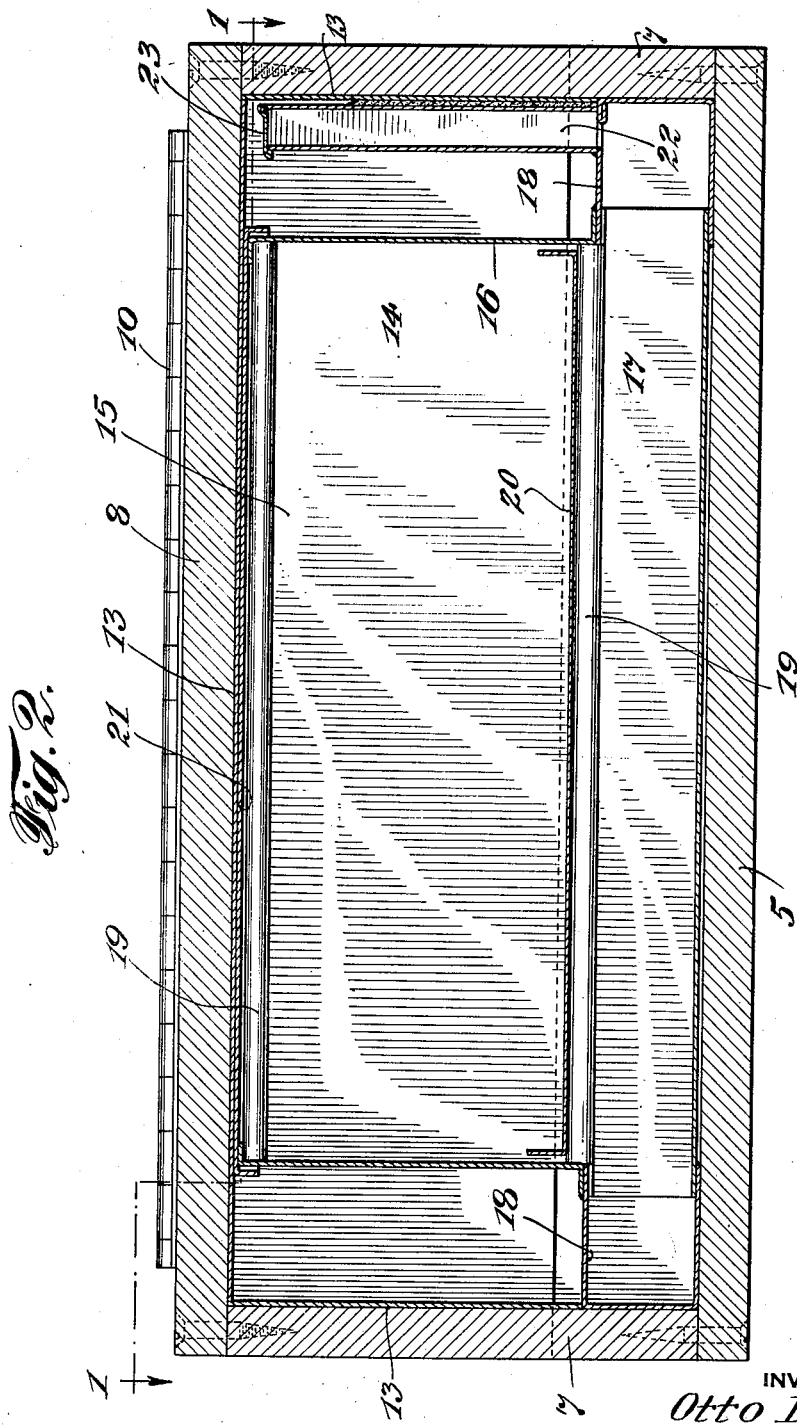

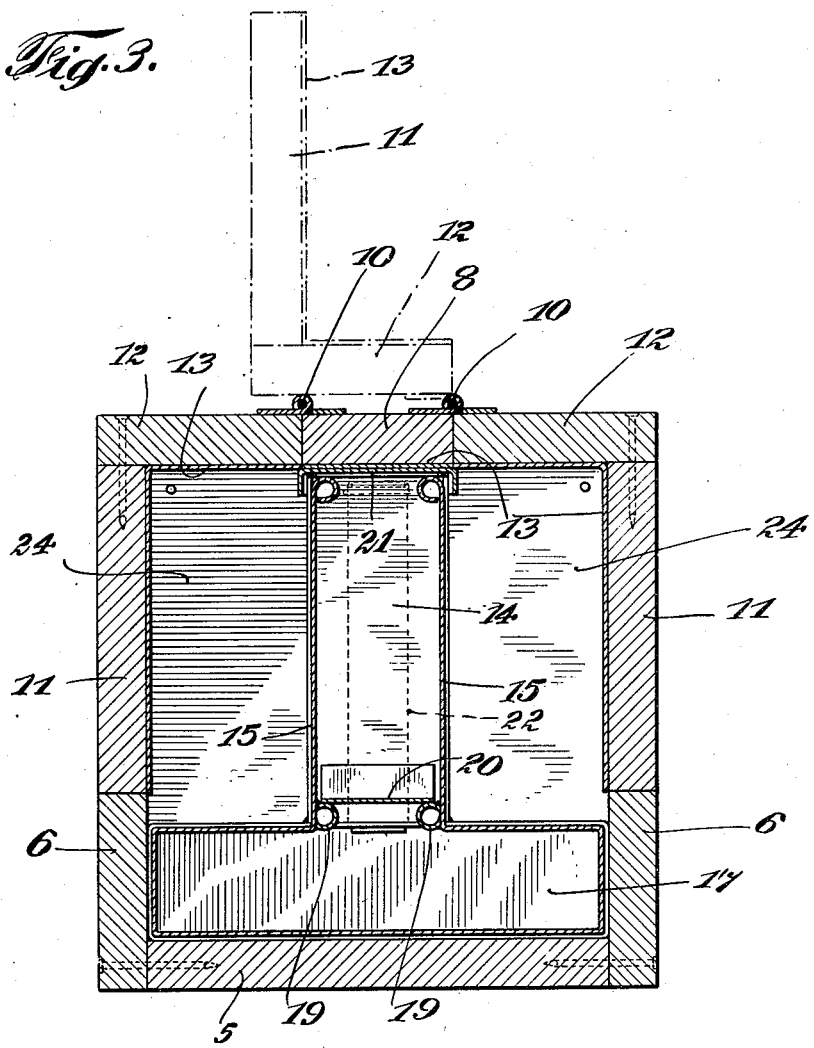

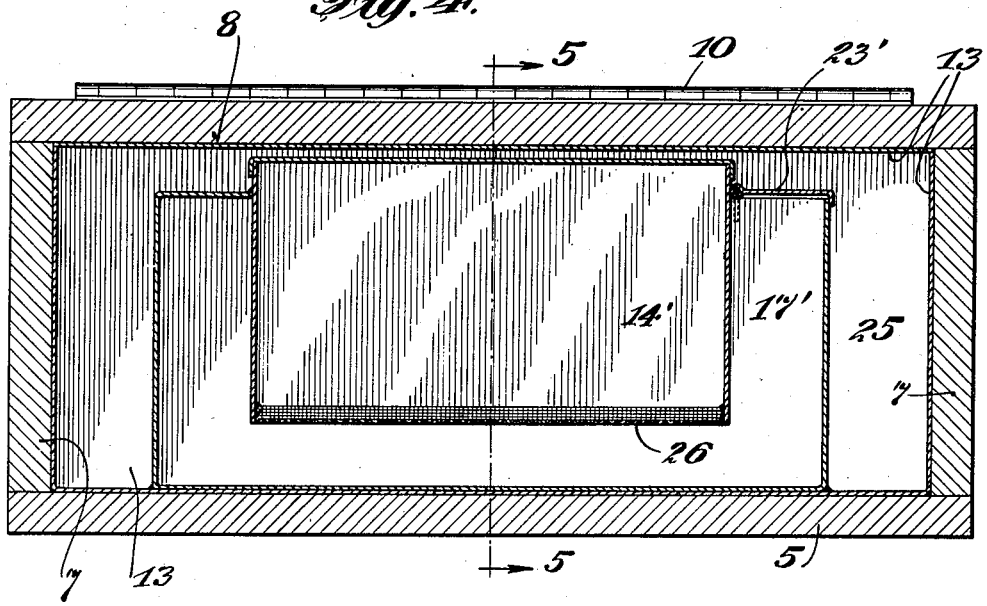
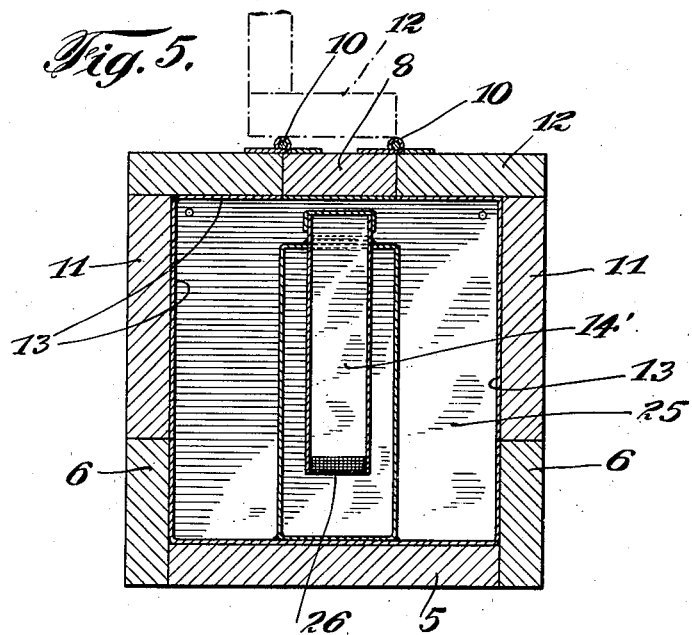

Patented July 5, 1932

1,866,389

UNITED STATES PATENT OFFICE

OTTO BAHLS, OF LONG ISLAND CITY, NEW YORK

REFRIGERATING DEVICE

Application filed January 24, 1929. Serial No. 334,738.

This invention relates to refrigerating devices, and has for its primary object and purpose to provide a simply constructed device provided with a food receiving chamber or chambers and a chamber for the ice or other frozen solid which is so arranged with respect to the food receiving chamber or chambers that while said solid is supported out of direct contact with the contents of the latter chambers, the low temperature air circulated through said chambers must pass through the food stuffs to the exterior of the device.

It is another object of the invention to provide a refrigerating device primarily designed of a convenient size so that it will occupy a minimum of space and can be readily carried in a motor car or other vehicle, and which will have a food receiving space of comparatively large capacity and in which either ice or solidified carbon dioxide gas may be used as the refrigerating medium.

It is an additional object of the invention to provide such a refrigerating device which is so constructed that either the gas or the cold water from the solidified solid will be retained in contact with one or more of the walls of the food compartment so that the full benefit thereof will be obtained in maintaining a low temperature in the latter compartments.

With the above and other objects in view, the invention consists in the improved refrigeration device, and in the form, construction and relative arrangement of its several parts as will be hereinafter more fully described, illustrated in the accompanying drawings, and subsequently incorporated in the subjoined claims.

Referring in detail to the drawings, in which I have illustrated several simple and practical embodiments of my invention, and in which similar reference characters designate corresponding parts throughout the several views,—

Figure 1 is a top plan view partly in section as indicated by the line 1—1 in Fig. 2, showing one practical construction of my improved refrigerating device;

Fig. 2 is a longitudinal sectional view taken on the line 2—2 of Fig. 1;

Fig. 3 is a transverse sectional view taken on the line 3—3 of Fig. 1;

Fig. 4 is a longitudinal section similar to Fig. 2 showing a slightly modified form of the invention, and Fig. 5 is a transverse sectional view taken on the line 5—5 of Fig. 4.

Referring in detail to the drawings, and more particularly to Figs. 1, 2 and 3 thereof, the body of the device may be conveniently constructed of wood of a suitable thickness, or of a desirable composition insulating material and consists of the bottom 5, the opposite side walls 6 and the end walls 7. This body may be of any suitable predetermined dimensions, and at the top thereof a relatively narrow centrally disposed longitudinally extending bar 8 is rigidly fixed at its opposite ends to the end walls 7 by means of the screws indicated at 9. To the opposite longitudinal edges of this bar 8 at the upper side thereof, doors or closures are hinged as shown at 10, each of said closures preferably consisting of a side member 11 and a top member 12, said side members when the closures are in closed position, being in the plane of the side walls 6 of the body structure while the top members 12 thereof are positioned in the plane of the central bar 8. The inner surfaces of each of the members 8, 11 and 12 are lined with sheet metal as indicated at 13.

Within the body of the device there is centrally located a chamber 14 to receive the ice or other solid refrigerant. The chamber is preferably constructed of sheet metal having opposite side walls 15 and the end walls 16, said end walls being suitably spaced from the opposite end walls 7 of the body of the device, and the side walls 15 spaced apart for a distance substantially equal to the width of the central top bar 8. These side walls 15 are laterally extended at their lower ends, the metal sheet being formed to provide a chamber 17 extending substantially across the entire width of the interior of the device between the side walls 6 thereof.

Extensions of this chamber indicated at 18 are connected with the opposite ends thereof to close communication between said chamber and the chamber 14 and the space between the walls 15 of the latter chamber and the closure members 11.

At the lower ends of the side walls 15 of the chamber 14 and at the inner sides thereof, suitable supports 19 are fixed upon which the metal plate 20 is positioned, said plate extending substantially the entire length of the chamber 14 and supporting the ice or other solidified refrigerant with which said chamber will be filled.

The upper end of the chamber 14 is adapted to be closed by a suitably formed cover member 21, and in order to position this cover member over the upper end of said chamber or to remove the same, it is first necessary to remove the screws 9 and detach the central bar 8. However, this is not an essential feature, and if desired, other means may be provided for affording access to the chamber 14.

With one of the end extensions 18 of the chamber 17, the lower end of a vent conduit 22 is connected, the upper end of said conduit being provided with a suitable pivoted closure indicated at 23. Through this conduit, the contents of the base chamber 17 may be removed or permitted to escape.

From the above construction, it will be seen that the spaces afforded between the side walls 15 of the central chamber 14 and the side members 11 of the hinged closures provide two food receiving compartments 24 of appreciable capacity, and the food which may be packed within said compartments will be held in direct contact with the walls of said chambers 14 and 17.

As a refrigerant, either ice in particles of convenient size or solidified carbon dioxide gas may be packed within the chamber 14. Either the water from the ice or the gas will collect in the lower or base chamber 17, and be retained therein so that the cold will be transmitted through the walls of said base chamber as well as through the side walls 15 of the chamber 14 and must pass through the food stuffs contained in the chambers 24. Thus, the foods in said chambers will be kept or preserved at a desirably low temperature.

It will be seen that a device of the above construction may be manufactured at very low cost and in suitable sizes convenient to be carried by motorists for the purpose of keeping the foods in proper edible condition for a comparatively short period of time. However, it is also contemplated that such a device may also be produced in larger sizes for household use.

In Figs. 4 and 5 of the drawings, I have shown a construction of my invention which is particularly designed for use of solidified carbon dioxide gas as a refrigerant. In view of the very low temperature of this material, it is not desirable that the refrigerating effects thereof be transmitted directly through the wall of the chamber containing the same to the food stuffs, but the gas which emanates from the solid as it disintegrates, is more nearly of the desired temperature.

Therefore, as shown, the refrigerant receiving chamber 14' is surrounded by a secondary chamber 17', the walls of which are suitably spaced from the walls of the chamber 14' and the side and end walls of the body of the container. The bottom of the chamber 14' is also suitably spaced above the bottom of the chamber 17' and consists of a sheet of heavy wire netting or reticulated material indicated at 25. Thus, the gases from the solidified carbon dioxide may freely pass through this bottom material into the outer chamber 17'. The top of this chamber at one end of the chamber 14' is provided with a pivoted closure 23' which may be opened to vent the gases from the chamber 17'. Thus the cold from the gases accumulating in the outer chamber 17' will be transmitted through the walls of said chamber to the food containing compartment 24' which in this instance, extends the entire internal height of the device and entirely surrounds the chamber 17'. The construction of the outer body of the device is substantially the same as that previously described. In both cases however, it will be understood that the form and mounting of the closure members for the food compartment or compartments, is not of importance, and that these closures might otherwise be constructed and mounted than as indicated in the accompanying drawings.

From the above description considered in connection with the accompanying drawings, the construction and manner of operation of the several described embodiments of the invention will be clearly and fully understood. It will be seen that I have provided a refrigerating device which will be very serviceable in practical use especially for the purpose of keeping at a proper temperature wrapped or packaged foods such as are usually carried on picnics and similar occasions.

Of course, it is apparent that suitable latch means may be provided for the doors or closure members, and that any convenient form of handle for carrying the device may be suitably attached to the opposite sides thereof. Likewise, while I have referred to one practical construction and arrangement of the several elements for each form of my invention as above described, it will be understood that in these particulars various structural modifications might be resorted to, and I accordingly reserve the privilege of adopting all such legitimate changes therein as may be fairly embodied within the spirit and scope of the invention as claimed.

I claim:

1. A refrigerating device including an elongated body structure having a relatively narrow longitudinally extending bar at the top thereof and angular closure members hinged to opposite edges of said bar and each having a top part and a side part, a relatively narrow longitudinally extending refrigerant receiving chamber wholly positioned within the plane of said central top bar of the body structure and of uniform dimensions throughout its depth, refrigerant supporting means substantially closing the lower end of said chamber, a second chamber disposed within said body structure and substantially enclosing said first named chamber, the corresponding walls of said chambers being spaced apart, and the space between said walls adapted to receive a residual of the refrigerant in the first named chamber.

2. A refrigerating device including an elongated body structure having a relatively narrow longitudinally extending bar at the top thereof and angular closure members hinged to opposite edges of said bar and each having a top part and a side part, a relatively narrow longitudinally extending refrigerant receiving chamber wholly positioned within the plane of said central top bar of the body structure and of uniform dimensions throughout its depth, a sheet of wire mesh material substantially closing the lower end of said chamber, a second chamber disposed within said body structure and substantially enclosing said first named chamber, the corresponding walls of said chambers being spaced apart, and the space between said walls adapted to receive a residual of the refrigerant in the first named chamber.

3. A refrigerating device including a body structure comprising a bottom and vertical end walls and relatively narrow side walls extending upwardly from the bottom between said end walls, a refrigerant receiving chamber centrally arranged within said body structure and spaced from the opposite sides and ends thereof, a second chamber within said body structure in communication with the lower end of the first chamber to receive a residual of the refrigerant therefrom, means substantially closing the lower end of the first chamber and supporting the refrigerant therein, a removable closure for the upper end of said first named chamber, and a removable top for said body structure including a central bar and means for securing the same to said end walls over the closure for said first named chamber, and L-shaped closures for said body structure hingedly mounted on opposite edges of said bar and having parts extending over the remaining top portion of the body structure and in line with the opposite side walls thereof to independently afford access to the storage space within said body structure at either side of said refrigerant receiving chamber.

In testimony that I claim the foregoing as my invention, I have signed my name hereto.

OTTO BAHLS.